M. ARNDT.
MEASURING APPARATUS.
APPLICATION FILED DEC. 16, 1911.

1,075,620.

Patented Oct. 14, 1913.

3 SHEETS—SHEET 3.

Witnesses
B. Dommers
E. Leckert

Inventor
Max Arndt
By Henry Orth
Atty

UNITED STATES PATENT OFFICE.

MAX ARNDT, OF AIX-LA-CHAPELLE, GERMANY.

MEASURING APPARATUS.

1,075,620.   Specification of Letters Patent.   Patented Oct. 14, 1913.

Application filed December 16, 1911. Serial No. 666,264.

*To all whom it may concern:*

Be it known that I, MAX ARNDT, a subject of the German Emperor, residing at the city of Aix-la-Chapelle, in the Kingdom of Prussia, German Empire, have invented a new and useful Improvement in Measuring Apparatus, of which the following is a specification.

My invention relates to mechanism for indicating and recording the results of instruments operating under periodic pressure, such as, for example, pyrometers, gas-analyzing apparatus and the like.

The object of my invention is to remove the style, pen or other recording device from the recording paper with the aid of a manometer which operates when the measuring pressure has ended, and for example, when a pre-determined measuring pressure has been attained in the instrument.

Figure 1:
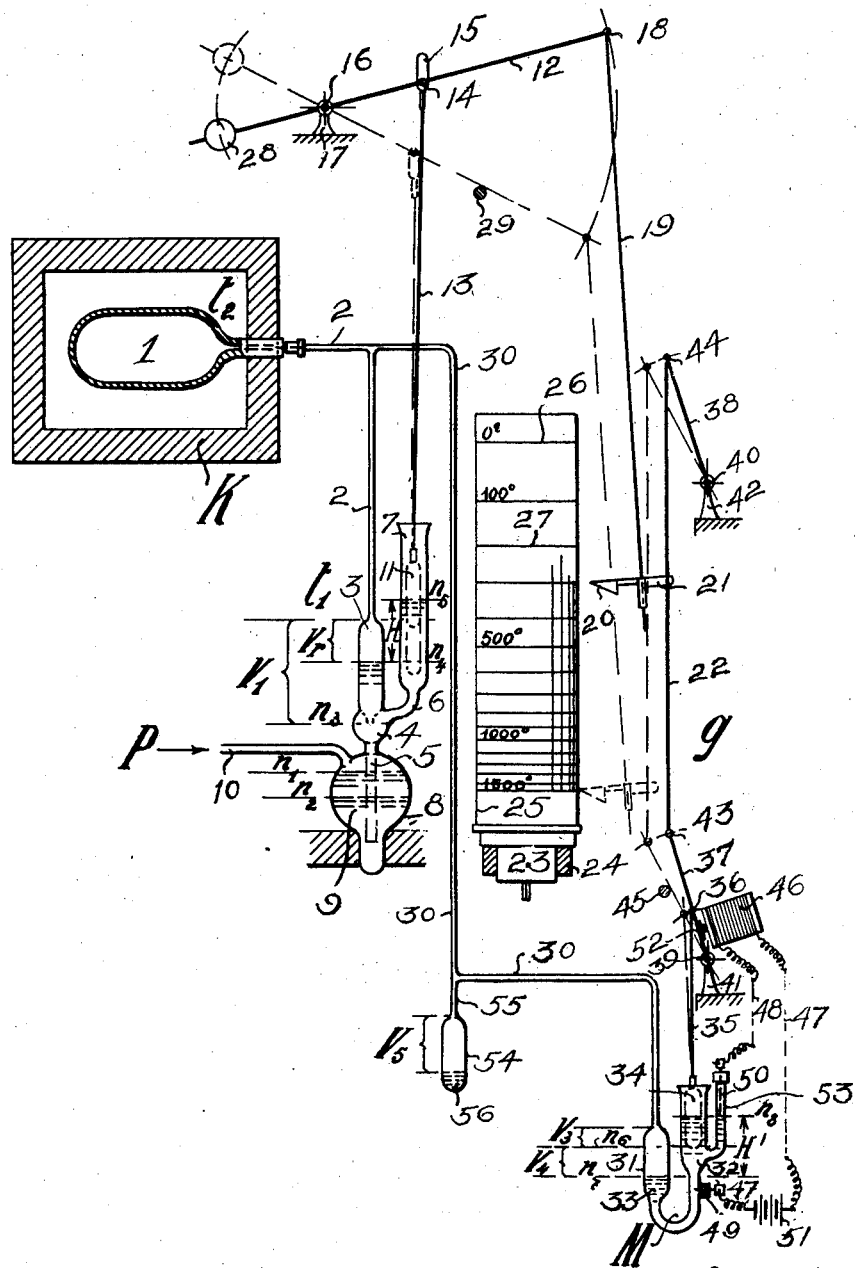
Figure 2:
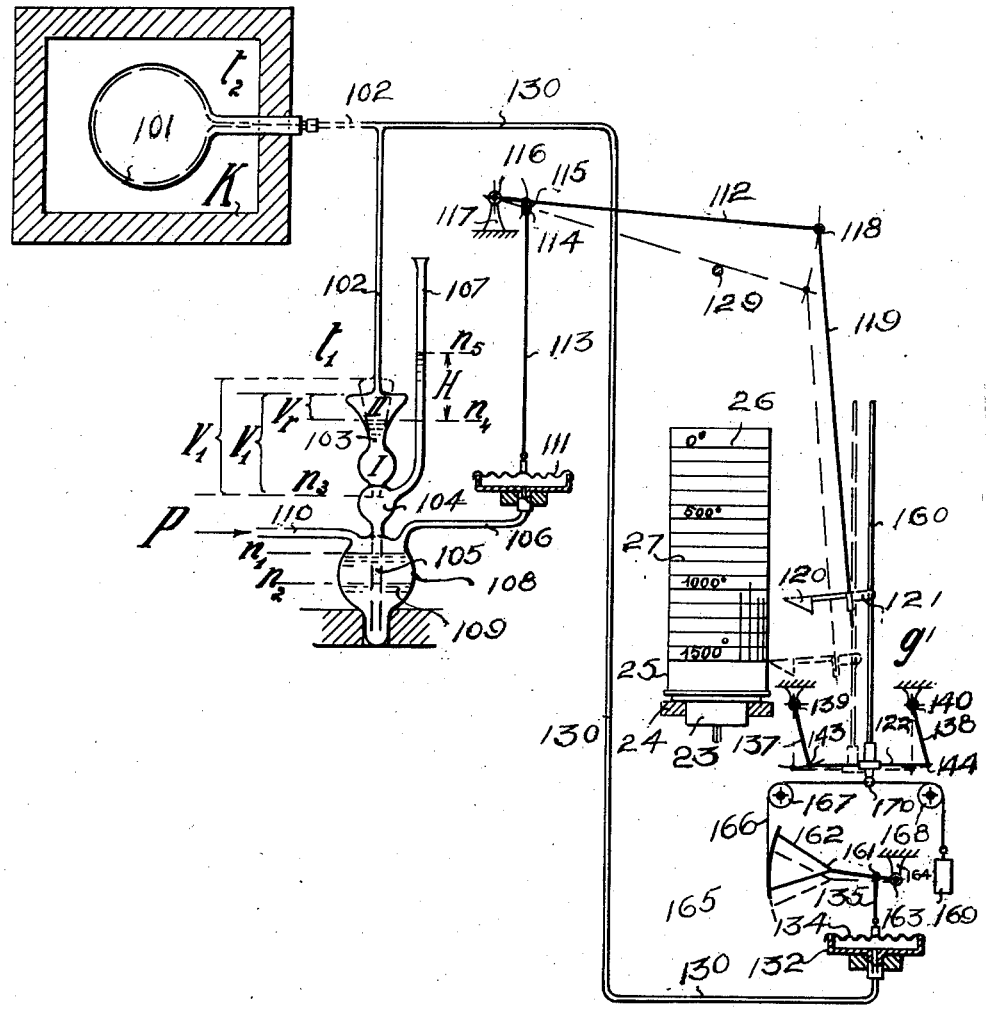
Figure 3:
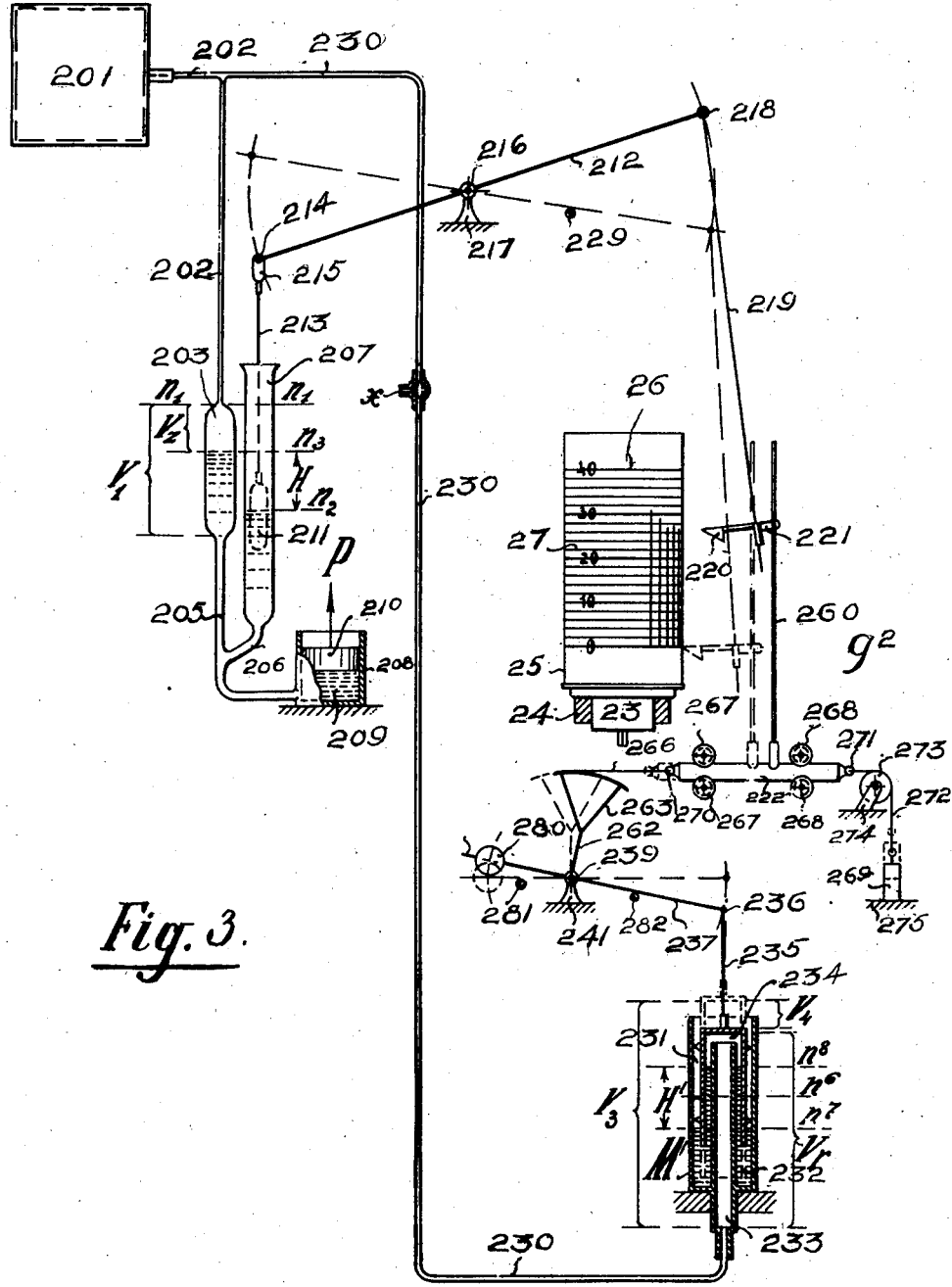

In the accompanying drawings the device is diagrammatically represented in Figures 1 and 2 in combination with a pyrometer, and in Fig. 3 in combination with a vacuum gage; it may, however, likewise be employed with other instruments and apparatus by means of which pressures corresponding to the results are to be recorded, for instance, gas absorption apparatus, pressure gages, and the like.

The apparatus or instrument according to Fig. 1 serves as a pyrometer and is constituted as follows: A hollow body 1 and exposed to the temperature $t_2$ to be measured in a flue K is connected by a narrow air pipe 2 with a second hollow body 3 which is filled with air, exposed to the temperature $t_1$ of the atmosphere, and opens into a chamber 4, from which a tube 5 depends, and a tube 6 branches off laterally. The tube 6 carries an upwardly directed pressure tube 7 open to the atmosphere, the depending tube 5, on the contrary, opens into a pressure chamber 8 which is partially filled with a liquid, for instance mercury, 9, and has a lateral pressure tube 10. The tube 5 is immersed approximately down to the bottom of the holder 8 containing mercury 9. The pressure tube 7 contains a float 11 that operates a lever 12 through the medium of a rod 13 and a pin 14, or the like. The rod 13 may have a loop 15, or the like, in order to obtain play about the pin 14 or the like, on the lever 12. This lever is fulcrumed on an axle 16 journaled in a pedestal 17. One end of this lever 12 carries by means of a pivot, knife edge, or the like 18, a rod 19 which carries a recording member 20, for instance, a pen, style or the like. The pen 20 has a loop 21 or the like, with which a pen-removing member 22, for instance a rod or the like, engages. Clockwork 23 mounted on a bracket 24 slowly rotates a drum 25 carrying the record paper 26 provided with a scale 27. A counterweight 28 acts as a counterpoise for the pen and its rod, and 29 is a stop for the lever 12.

The disconnecting device shown in Fig. 1 is constituted as follows: An air pipe 30 branches off from the air pipe 2 and leads to the disconnecting manometer M. This manometer M comprises a U-shaped container whose limbs 31 and 32 are partially filled with liquid, e. g., mercury, that actuates a float 34. This float is connected by a rod 35 and a pin 36 to a disconnecting parallelogram constructed as follows: Two links 37 and 38 are mounted to rock at one end on pivots 39 and 40 respectively, mounted in two standards 41 and 42, or the like. The other ends of the links 37 and 38 are pivotally connected at 43 and 44 to the pen-removing rod 22 or the like, which engages with some play, as described, with the pen 20 by means of the loop 21. A stop 45 for the link 37 determines the rest or starting position of the pen removing mechanism g and of the float 34 which may be lifted by the mercury 33 shortly before the column H of mercury has been completely adjusted.

For actuating the disconnecting mechanism g I may provide, instead of the float 34, an electro-magnet 46 which is connected by two conductors 47, 48 to two contact pieces 49, 50, and a battery 51. The armature 52 of the electromagnet is mounted, for example, on the link 37. The contact pieces 49, 50, may be situated directly in or on a manometer limb 32, or, as shown, in a separate mercury tube 53 branching from the limb 32.

The apparatus illustrated in Fig. 1 may be provided with an adjusting vessel 54 that is connected, say by a tube 55, with the pipe 30, or in any other suitable manner with the interior of the instrument, and is partially filled with a compensating liquid 56, the purpose being that when the lengths of the pipes 2, 30 and 55 vary, the volume of the air in the instrument is always constant, owing to a volume $v_5$ of regulating air.

In Fig. 2 a hollow spherical vessel 101 is placed in flue K whose temperature $t_2$ is to be measured, and is connected by tube 102 to vessel or chamber 103 of somewhat different shape than vessel 2, Fig. 1. Vessel 103 opens at the bottom into 104 whose depending tube 105 enters mercury 109 in chamber 108 provided with an air inlet 110 and a branch tube 106 leading to a spring manometer, 111. The manometer 111 is pivotally connected to the lower end of a rod 113 whose eye or loop 115 engages pin 114 on lever 112 that is pivoted at 116 in 117. Connected to the free end of lever 112 at 118 is the pen-carrying rod 119, having a pen 120 with loop 121. A stop pin 129 supports lever 112 in zero position. The manometer operates this mechanism which is similar to the mechanism Fig. 1 operated by float 11. The tube 107 serves only as a pressure tube for equalizing the internal pressure in the pyrometer with the atmospheric pressure at intervals between measurements.

The air chamber 103, similar to chamber 3 Fig. 1, is shown divided into two compartments I and II, of which the compartment I is of a volume sufficient to compress the total volume of air, (entrapped at atmospheric pressure B in chamber 101, pipes 102 and 130,) from this barometric pressure to the pressure to be measured B—H. Pressure is also placed on the manometer 132 through pipe 130 connected to pipe 102.

As shown in dotted lines, the chamber II may be varied in shape; it may be conical, or it may have the shape of a hyperboloid of revolution for the purpose of enabling the scale 27 on the record sheet to be proportional or uniform or approximately so, whereas when the air chamber 1, Fig. 1 is substantially cylindrical, the scale must vary progressively.

The disconnecting device $g'$ Fig. 2, comprises a parallel motion device having links 137 and 138 whose upper ends are pivoted at 139 and 140, and whose lower ends are pivotally connected at 143 and 144 to a rod 122. The rod 122 carries a vertical rod 160 passing through loop 121 of pen or stylus 120.

The parallel motion device $g$ is moved from the diaphragm 134 of the manometer 132 through the medium of a rod 135 pivotally connected to the diaphragm 134. The upper end of rod 135 is pivotally connected at 161 to a lever 162 that is pivoted at 163 in a bracket 164. The lever 162 has a sector 165 at its operating end to which is connected a cord, tape or the like, 166 passing over guide pulleys 167 and 168 attached to a counterweight 169. This cord is connected to a ring 170 or other fastening to the rod 122.

Fig. 3 illustrates an instrument by means of which a pressure below atmospheric pressure in chamber 201 may be periodically measured. The chamber 201 is connected by pipe 202 with vessel or chamber 203 which is connected by pipe 205 to means for producing a partial vacuum, for example, a cylinder 208 filled with mercury 209 and having a piston 210. The pipe 205 has a branch 206 enlarged at its upper end into a container or low pressure tube 207 containing a float 211. This float is connected by rod 213 eye 215 and pin 214 to one end of lever 212 which is pivoted at 216 in a support 217. The lever 212 rests against a stop pin 229 in zero position, and at its other end is pivotally connected at 218 to a rod 219 carrying pen or stylus 220 having a loop 221 through which passes a rod 260. The rod 260 forms part of the pen removing mechanism $g_2$ and is connected to the straight-edge or rod 222 supported between two pairs of guide rollers 267 and 268. The rod 222 is connected at 271 to a cord 272 guided over a pulley 273 that is supported in a bracket 274. On the end of the cord 272 is fastened a retracting weight 269 that engages a support or stop 275. The pipe 202 has a branch pipe 230 having a three-way venting cock $x$ and is connected to a manometer M' whose outer vessel 231 contains a sealing liquid 232, as mercury.

Over the air inlet column of the manometer M' is a bell 234 dipping into the sealing liquid 232 and having an actuating rod 235. The rod 235 is pivotally connected at 236 to a lever 237 pivoted between its ends at 239 to a support 241. Connected to lever 237 is an arm 262 having a sector end 263 one end of a cord 266 being secured to it, and the other end of said cord being connected at 270 to the rod 222. The lever 237 is provided with a counterweight 280 and the extreme positions of the lever are defined by stops 281 and 282 one on each side of the pivot point 239 and below the lever 237.

The pyrometer shown in Fig. 1 operates as follows:—In the rest condition, i. e., during an interval between measurements, the mercury 9 in the vessel 8 and in the pipe 5 is at its level of repose $n_1$; the mercury 36 in the manometer M is at its level of repose $n$ bounding a volume of air $v_3$, and all the internal chambers of the pyrometer are at atmospheric pressure B (height of the barometer). When a pressure P, e. g., a pressure of hot air, occurs however, in the vessel 8 through the tube 10, the mercury 9 in the vessel 8 will sink, but rise in the tube 10. If the mercury 9 rises into the chamber 4 to the level $n_3$, a volume of air at atmospheric pressure B corresponding to the total internal volume of the chambers will be caught at this moment in the chambers 3, 1, 31, 54, and conduits 2, 30 and 55. Now if the mercury 9 rises farther in the tubes 3 and 7 in consequence of the pressure P increasing, then by reason of the pressure of mercury in the pressure tube 7 it also enters into the chamber 3, whereby the air in the whole pyrometer is compressed and, consequently, the mercury 33 in the chamber 31 of the manometer M sinks in 31 but rises in 32. Now, owing to the said compression of the air a quantity of air is compressed into the chamber 1 at the temperature $t_2°$ C., which air is heated from the outer temperature $t_1°$ C., to $t_2°$ C. This quantity of air taken from the chamber 3 will become smaller as soon as a column of mercury H of predetermined height is formed in the pressure tube C, and the greater the difference is between the temperatures $t_1$ and $t_2$, because the volume of air forced under the excess pressure H into the chamber 1 produces force, due to expansion resulting from the heating from $t_1$ and $t_2$, and consequently the pressure of the residual air $U_5$ in 54 and $V_r$ in 3, and that still located in the chamber 1 at the moment when a pressure column H occurs will be greater the greater $t_2-t_1$; consequently, the level $n_4$ of the mercury in chamber 3 varies in extent $V_1$. The levels $n_4$, $n_5$ determine the pressure column H and the level $n_2$ in the chamber D will vary, depending on the temperature difference.

In proportion as the pressure column H in the pressure tube C varies, the pressure column H′ bounded by the planes $n_7$, $n_8$ varies in the manometer limb 32, and consequently a volume of air $v_4$ is adjusted in the limb 31. The volume of air which was in the interior of the pyrometer at the occurrence of the excess pressure H to be measured and which is under this excess pressure $$= v_1 + v_2 + (v_3 + v_4) + v_5$$

volume of air in pipes 2, 30 and 55. This volume changes only with the change of volume $v_r$ of the residue caught by the temperature difference $t_2-t_1$ in the chamber 3.

From the foregoing the following measuring results: In the rest condition the pen 20 is pressed against the zero mark of the scale 27; the float 11 hangs freely in the tube 7, the float 34 hangs freely in the limb 32 of the manometer, or the electric contact piece 49 is released by the mercury 33. When the pressure P occurs for measuring purposes in the chamber 8, and when the mercury 9 reaches the float the latter will lift the recording mechanism and the pen, so that the latter records a line on the paper. When the excess pressure H to be measured occurs, this line will be of a length corresponding to the measurement of the temperature difference $t_2-t_1$. But as the excess pressure H′ also occurs at the same moment in the manometer M, and the float 34 will now shift the rod 22 through the medium of the rod 35 and the links 37, 38 so far that the pen 20 is moved away from the paper 26 and the recording of the excess pressure is terminated; the pen then remains inoperative should the pressure P in the chamber 8 rise still farther, or the mercury 9 in the chambers 3 and 7, as well as the mercury 32 in the limb 31 rise still farther, because the pen 20 has been moved away from the paper. When the pressure P falls in the chamber 8 the quantities of mercury 9 and 33 return again to their levels of repose $n_1$ and $n_6$, respectively; atmospheric pressure then again occurs in the interior of the pyrometer so that the latter is again ready for a new measurement. Just as the float 34 brings about the disengagement of the pen 20 with the record strip 26, this disconnection may be brought about by the electromagnet 46 (which may replace the float 34) by the electric circuit 49, 51, 47, 46, 48, 50, 32, being closed as soon as the mercury 33 reaches the contact piece 50, which is when the excess pressure H′ occurs in the manometer M and the magnet 46 then attracts its armature 52 on the link 37 of the parallel motion device $g$.

As the pressure H remains constant for all measurements or records with regard to the opportune disconnection of the pen 20, but as the residue of air $v_r$ still in the chamber 3 at the occurrence of this pressure H varies with the temperature difference $t_2-t_1$ according to the Gay-Lussac's law at various heights of the barometer, that is to say is greater when the barometer is high than when the barometer is low, the line recorded by the pen 20 for a definite temperature difference $t_2-t_1$ is shorter when the barometer is high than when it is low. Nevertheless, owing to the peculiar action of the pen removing device $g$ barometric actions are kept away from the measuring operations or are compensated for, because the bounding level or plane $n_8$ of the pressure column H′ in the manometer M is always a predetermined height, but the bounding level or plane $n_5$ of the pressure column H in the pyrometer pressure tube 7 is at various heights for a definite temperature difference $t_2-t_1$ at various heights of the barometer. The latter holds good, however, only when the recording mechanism is not actuated by the internal pyrometer pressure, but independently thereof, particularly by the driving pressure P, as in Fig. 2.

The pyrometer according to Fig. 2 operates similarly to that illustrated in Fig. 1, except that the recording device is actuated by the spring manometer 111, or by its diaphragm, which obtains its excess pressure directly from the pressure chamber 108, and except that the actuation of the pen removing means is effected by a spring manometer 132, which acts in other respects like the liquid manometer of Fig. 1.

The device for measuring pressure below atmospheric according to Fig. 3, operates as follows: Before a measurement is taken, i. e. during an interval between measurements, in which interval the interior of the instrument is exposed by any suitable device to atmospheric pressure, for example by the three-way cock $x$ the chamber or space $v_1$ and the float tube 207 are filled with mercury up to the level $n_1$; the pen 220 is on the zero line of the scale 27, the bell 234 in its position shown in dotted lines, and the lever 257 rests on its stop 281; further, the weight 269 is lifted from its rest 275. Now, if the interior of the instrument is shut off from the atmosphere for measuring purposes, and if the piston 213 of the cylinder 208 is then lifted by a force P, the mercury 209 in the float tube 207 falls lower than in the chamber 203. If the pressure H below atmospheric to be measured corresponding to a column of mercury H bounded by the planes $n_2$, $n_3$ is consequently obtained, a volume of air $v_2$ is inclosed in the chamber 203 which is then in direct proportion to the pressure below atmospheric pressure in the interior of the instrument and is to be measured, and which amount is indicated by the length of the line recorded by the pen 220. The recording is terminated by the action of the bell 234 in the manometer M′ or by the mechanism for disconnecting the pen, because the pressure H to be measured also acts on the interior of the said bell 234, so that its action becomes so great at the moment when the pressure H′ occurs that the counterweight 280 is overcome and the pen 220 is moved away from the paper 26 by the rod 260 with the aid of the weight 269. Accordingly, the value or length of the recorded line corresponds to the height of the volume $v_z$ of air in the chamber 203. In this instrument, also, the measurement is not influenced when the pressure below atmospheric in the instrument increases after the recording is terminated.

My apparatus may be used in connection with other instruments and apparatus in like manner as disclosed in the drawing, and hereinbefore mentioned in the specification. The same may be made in any other suitable equivalent forms, particularly the individual parts which are illustrated and described may be substituted one for another, without departing from my invention.

I claim—

1. The combination with means for entrapping a volume of gas, of means for placing this volume of gas under pressure, a manometer in communication with this volume of gas and a parallel motion device actuated by the manometer, and a recording element moved from its recording surface by said parallel motion device by the measuring pressure produced.

2. The combination with means for periodically entrapping a volume of air, of means to place the entrapped air under pressure, a manometer communicating with the air entrapped and containing a liquid whose level is varied by the varying volume of said air, a float in said manometer, a parallel motion device actuated by the float and a recording element moved into operative position by said float.

3. The combination with means for periodically entrapping a definite volume of gas; of means to place said volume under pressure, a manometer controlled by the pressure of said volume of gas, a parallel motion device operated by the manometer, and a recording element moved from its recording surface by said parallel motion device.

4. The combination with means for periodically entrapping a definite volume of gas; of means for placing said gas under pressure, a liquid manometer controlled by the pressure of said volume of gas, a float operated by the manometer, a recording element, a parallel motion device actuated by the float to remove said element from its recording surface in any position of said element relatively to said surface.

5. The combination with means for periodically entrapping a definite volume of gas; of means for placing said volume of gas under pressure, a manometer actuated by pressure of said gas, a recording element, a manometer for actuating said element and controlled by said gas, a second manometer actuated by said gas, a parallel motion device actuated by said second manometer for removing the recording element from its recording surface.

6. The combination with means for periodically entrapping a definite volume of gas; of means to place said volume of gas under pressure, a manometer controlled by said gas, a recording element actuated by said manometer, a second manometer actuated by said gas, means actuated by said second manometer for removing said element from its recording surface, and means between the two manometers for compensating for atmospheric temperature changes.

7. The combination with means for periodically entrapping a definite volume of gas; of a gas chamber enlarging upwardly, means for placing the gas under pressure, a manometer controlled by said gas, a recording element actuated by said manometer, a second manometer influenced by the pressure of said gas, and means for removing the recording element from its recording surface and actuated by said second manometer.

8. The combination with means for entrapping a definite volume of gas; of means to change the pressure of said gas, temperature controlled means to additionally change the pressure of said gas, a manometer controlled by the pressure of the gas, a recording element actuated by said manometer, means for removing said element from its recording surface, and a second manometer controlled by the pressure of said gas to actuate said removing means.

9. The combination with means for entrapping a definite volume of gas; of means to change the pressure of said gas, temperature controlled means to additionally change the pressure of said gas, a manometer controlled by the pressure of the gas, a recording element actuated by the manometer, means for removing said element from its recording surface, a second manometer controlled by the pressure of said gas to actuate said removing means, and means compensating for the change of volume of the gas due to atmospheric temperature changes.

In testimony whereof I have signed my name to this specification in the presence of two subscribing witnesses.

MAX ARNDT.

Witnesses:
    FRAU MARY KLEIN,
    HENRY CUSAPLICZ.